United States Patent [19]
Seitz

[11] Patent Number: 5,506,746
[45] Date of Patent: Apr. 9, 1996

[54] ELECTROSTATIC POWDER COATING GUN AND METHOD OF GENERATING A HIGH VOLTAGE IN SUCH A GUN

[75] Inventor: Kurt Seitz, Widnau, Switzerland

[73] Assignee: Wagner International AG, Altstatten, Switzerland

[21] Appl. No.: 126,512

[22] Filed: Sep. 24, 1993

[30] Foreign Application Priority Data

Sep. 24, 1992 [DE] Germany ............... 42 32 026.7

[51] Int. Cl.⁶ .................................. B05B 5/00
[52] U.S. Cl. .................................. 361/228; 361/225
[58] Field of Search .................. 361/247, 248, 361/225, 226, 227, 228; 323/212, 215, 355; 363/157

[56] References Cited

U.S. PATENT DOCUMENTS

| | | | |
|---|---|---|---|
| 4,389,601 | 6/1983 | Sullivan | 318/118 |
| 4,943,779 | 7/1990 | Pederson et al. | 328/14 |

FOREIGN PATENT DOCUMENTS

WO90/07381  7/1990  WIPO.

*Primary Examiner*—Jeffrey A. Gaffin
*Attorney, Agent, or Firm*—Hill, Steadman & Simpson

[57] ABSTRACT

The invention provides a method of generating a high voltage in an electrostatic powder coating gun with a high-voltage generator having a transformer and a high-voltage cascade arrangement. The primary coil of the transformer is fed with an a.c. supply voltage operating at a working frequency. During operation of the coating gun, the frequency of the supply voltage is continuously varied about the working frequency, the current intensity of the primary coil current of the transformer is also continuously detected and the direction of frequency variation is reversed every time an increase in the current intensity of the primary coil current is determined. An electrostatic powder coating gun operating with the present high-voltage generating method includes a current detection circuit for continuously detecting the current intensity of the primary coil current of the transformer, a sweep generator for continuously varying the frequency of the supply voltage about the working frequency, and a control for controlling the operation of the sweep generator.

13 Claims, 4 Drawing Sheets

ELECTROSTATIC POWDER COATING GUN AND METHOD OF GENERATING A HIGH VOLTAGE IN SUCH A GUN

BACKGROUND OF THE INVENTION

The present invention is directed to a method of generating a high voltage in an electrostatic powder coating gun and to an electrostatic powder coating gun.

Known powder coating devices generally have a high-voltage generator comprising a transformer and a high-voltage cascade arrangement at the transformer output side. The output voltage from the transformer is supplied to the low-voltage input terminal of the high-voltage cascade arrangement, and the output voltage from the high-voltage cascade arrangement is supplied to a high-voltage coating electrode. In the operation of the coating device, the primary coil of the transformer is fed from an a.c. power supply operated at a working frequency. To this end a power supply unit is normally provided with such known coating guns for outputting an a.c. supply voltage at a working frequency matched with the components of the high-voltage generator, in which the high-voltage transformer constitutes the frequency-determining portion of this "free-running oscillator", as it is called. The operation of the high-voltage generator depends on the individual components thereof such as the transformer, high-voltage cascade arrangement etc., as well as inductive and capacitive influences which may, for instance, be caused by length, cross-section and type of cable or by external disturbances.

When the coating device is activated, the above-described prior art oscillators must build up to the working frequency and are required during operation to maintain this working frequency to the greatest extent possible. The working frequency of the high-voltage generator is predominant in determining the primary coil current of the transformer. If possible, the high-voltage generator should operate at a frequency where the primary coil current is minimum so that the efficiency of the high-voltage generator is maximum. This minimum of primary coil current is significant, for example, with the cell coils frequently used in such high-voltage generators. FIG. 1 is an explanatory diagram showing the primary coil current I as dependent on the frequency F of the supply voltage, where three working points $f_1$, $f_2$ and $f_3$ are illustrated. The various working points where the primary coil current minimum $I_{min}$ exists substantially depend on system design. The primary coil current will rise when the frequency of the supply voltage in a high-voltage generator deviates from the working point either in positive or negative direction due to system load or external interferences.

Various difficulties usually occur with the known systems. The high-voltage generator may be designed for a predetermined constant load with a stationary power unit, fixed cable lengths and a given transformer and high-voltage cascade arrangement, i.e. it may be designed for a working point at which the working frequency, the primary coil current, and the high voltage remain constant. But if the attenuation of the thus formed oscillator circuit varies due to different load currents, such a system is unable to correspondingly adapt to the change of conditions. This leads to a change in current input to the high-voltage generator and consequently the desired output voltage cannot be maintained, so that the efficiency is significantly deteriorated. Very high loads may result in a temporary complete failure of the high-voltage output. Also, the tolerances of the a.c. and d.c. amplification factors of oscillator transistors and feeder cables will act on the characteristics of the entire oscillating circuit. Moreover, it has been found in practical use that with greater cable lengths such oscillators exhibit substantial power loss or become unable to oscillate.

SUMMARY OF THE INVENTION

It is therefore an object of the present invention to provide a powder coating gun with a high-voltage generator, and a method of generating a high voltage in a powder coating gun, in which a substantially constant oscillating circuit for the high voltage is achieved. The high-voltage generator is designed to supply a constant maximum high voltage irrespective of any disturbances and fluctuations of the inductive and capacitive values of the system.

The high-voltage generator and the method of generating a high voltage according to the instant invention constitute a "self-optimizing active resonant system", as it is called. The high-voltage generator is operated by an a.c. voltage the frequency of which is continuously increased and decreased (wobbled) within a limited range. The primary coil current is continuously measured whereby the increase or decrease of the primary coil current is detected. When the current decreases, the sweep direction is maintained, and when the current increases, the sweep direction is changed. In this way an indirect matching of the working frequency with the coil characteristics is obtained.

The oscillating circuit, and hence the output voltage from the high-voltage generator, is largely independent of the system components such as the transformer and the feeder cables, because the transformer is no longer itself a frequency-determining part of the oscillating circuit. Rather, in the high-voltage generator of the instant invention, the optimum working frequency is determined with the aid of the primary coil current, and by sweeping the frequency of the supply voltage and shifting the sweeping range in response to the primary coil current. Hence, in response to the instantaneous load, the supply voltage frequency is corrected so that the high-voltage generator is practically always operated within the range of the minimum primary coil current.

Furthermore, with the high-voltage generator of the instant invention, there are no response problems due to varying coil attenuation values. Also, the tolerances of this high-voltage generator with regard to no-load voltage, short-circuit current and UI-characteristic are very small.

BRIEF DESCRIPTION OF THE DRAWINGS

Below, the invention will be described in detail by means of an embodiment thereof with reference to the drawings, in which.

DETAILED DESCRIPTION OF THE PREFERRED EMBODIMENTS

Figure 1:
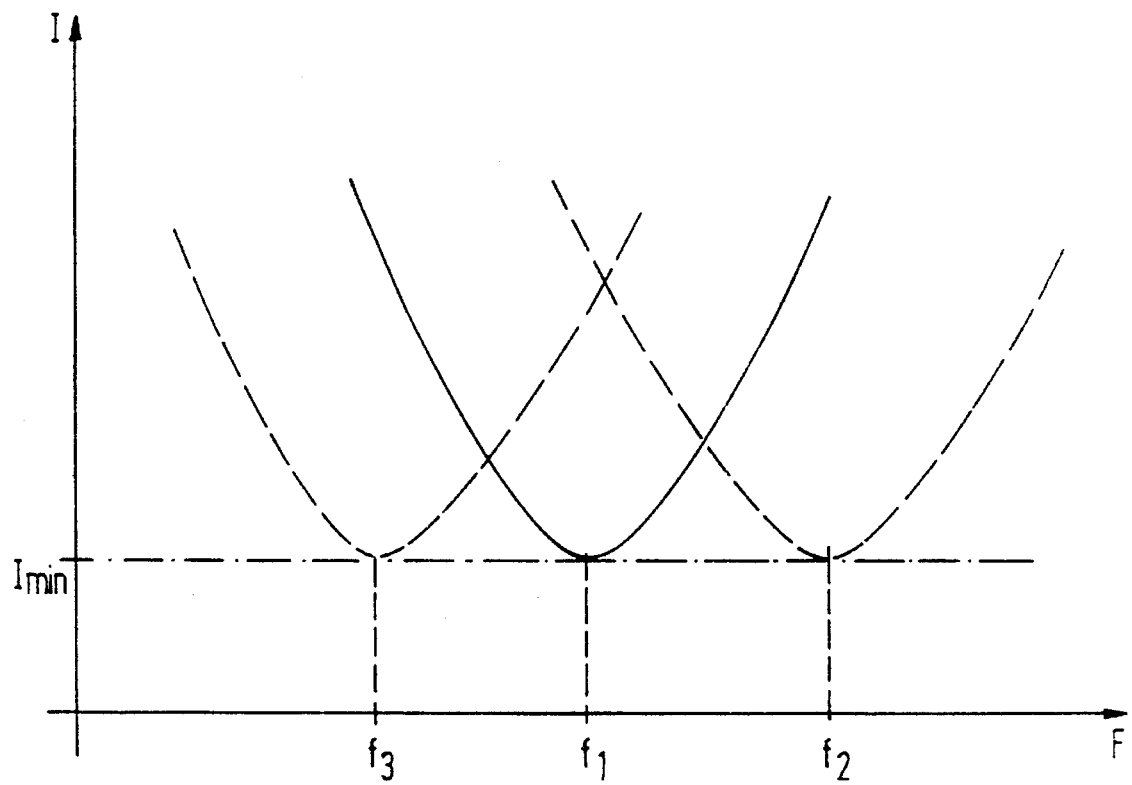
FIG. 1 is a diagram of the primary coil current as dependent on the frequency of the supply voltage.
Figure 1A:
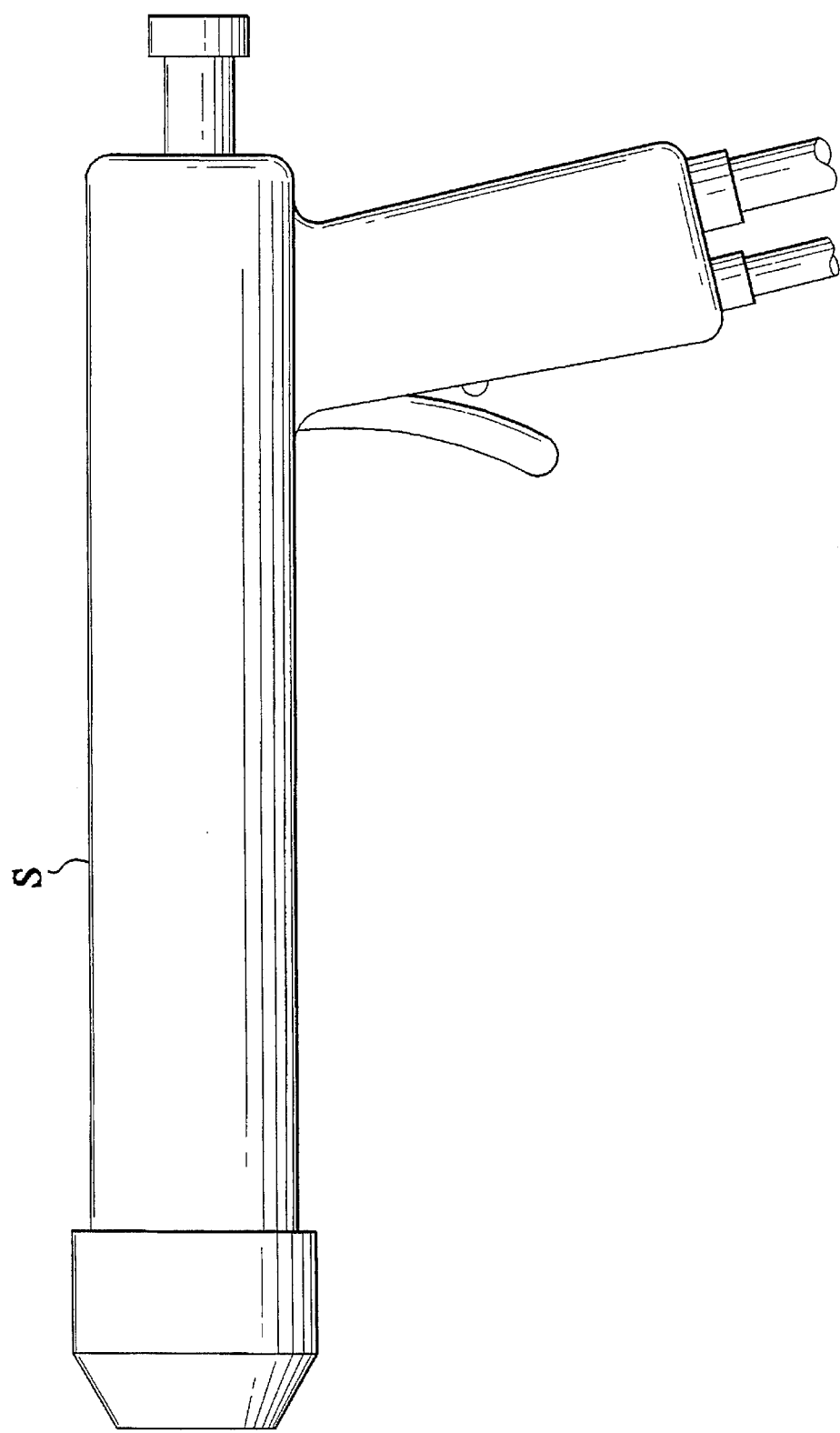
FIG. 1a is a side elevational view of an electrostatic powder coating gun.
Figure 2:
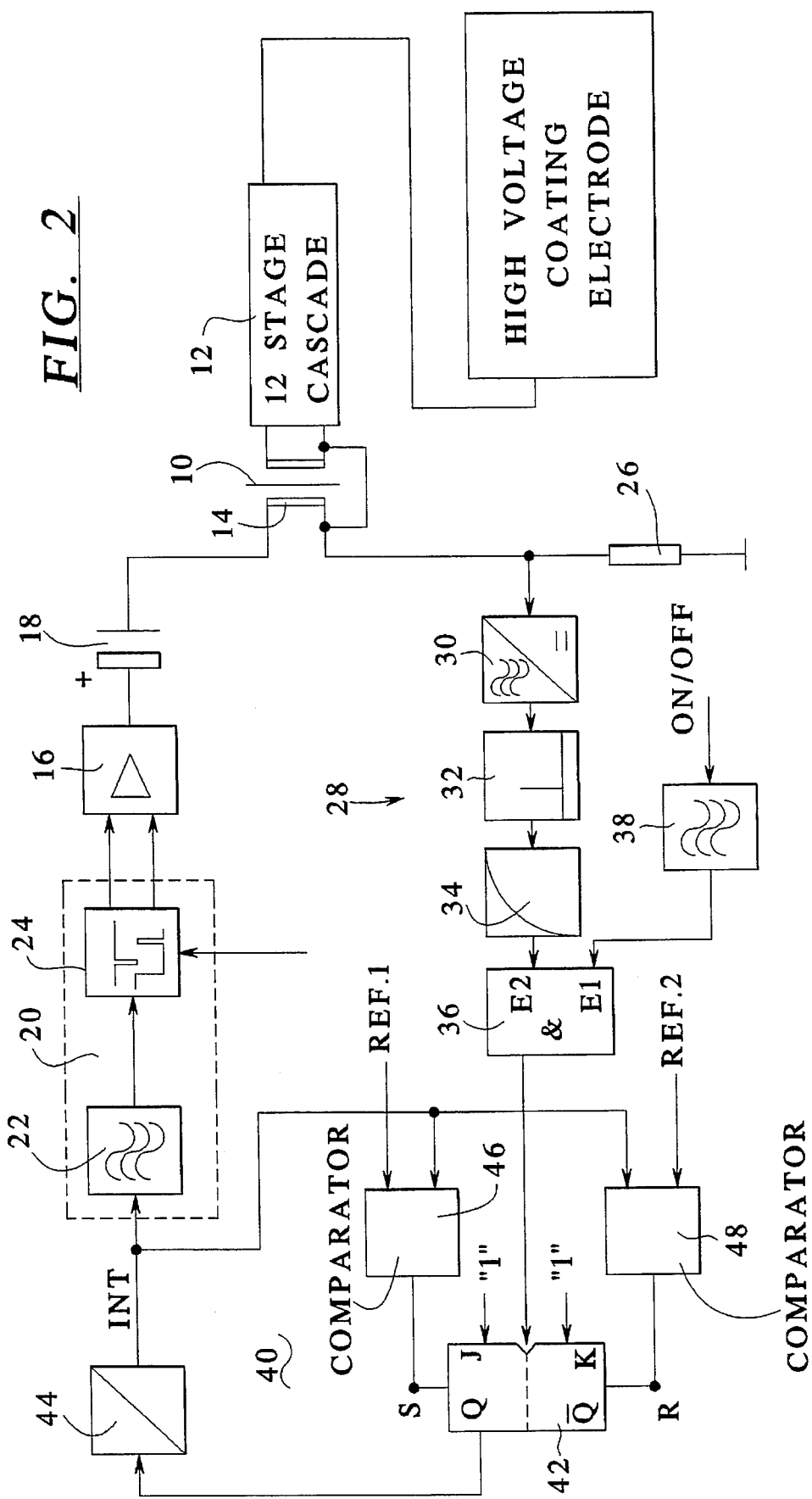
FIG. 2 is a schematic block diagram in accordance with an embodiment of the present invention.

FIG. 2 illustrates a high-voltage generator for an electrostatic powder coating gun S (FIG. 1a) comprising a transformer 10 and a high-voltage cascade arrangement 12 on the output side of the transformer. An output voltage from the high-voltage cascade arrangement 12 is supplied to a high-voltage coating electrode C. The primary coil 14 of the transformer 10 is driven through a push-pull amplifier 16 which operates as a switching output stage and an output capacitor 18 such as an electrolytic capacitor on the output side of said amplifier. A sweep generator 20 is connected to the input side of the push-pull amplifier 16, the sweep generator comprising a voltage-controlled oscillator (VCO) 22 and a lag control element 24.

The primary coil 14 of the transformer 10 is grounded through a precision resistor 26 for measuring the current. The voltage at the precision resistor 26, which is proportional to the current, is supplied to a current detection circuit 28 in which a peak rectifier 30, a differentiating element 32 and a first-order delay element (PT-1) 34 are connected in series. The output signal from this current detection circuit 28 is applied to one input E2 from AND gate 36. The other input E1 from AND gate 36 is coupled to an oscillator 38 adapted to output a square wave. The output signal from the AND gate 36 is provided to control means 40 for controlling the sweep generator 20.

The control means 40 comprises an edge-triggered JK latching element or JK flip-flop 42, the non-inverting output of which is connected through an integrator 44 to the input of the sweep generator 20, the output INT of said integrator 44 being feedback-coupled via two parallel comparators 46 and 48 to the set input S and the reset input R of the JK flip-flop 42, respectively. The clock input of the JK flip-flop 42 is connected to the output of the AND gate 36. A logic "1" is continuously applied to the J input and the K input of the JK flip-flop 42 so that the JK flip-flop operates like a T flip-flop; i.e., for every rising edge at the clock input of the flip-flop, the output signal Q thereof changes its polarity so that there results an output signal Q at half the input frequency, The respective second inputs of the comparators 46 and 48 are provided with reference signals Ref. 1 and Ref. 2, respectively.

Figure 3:
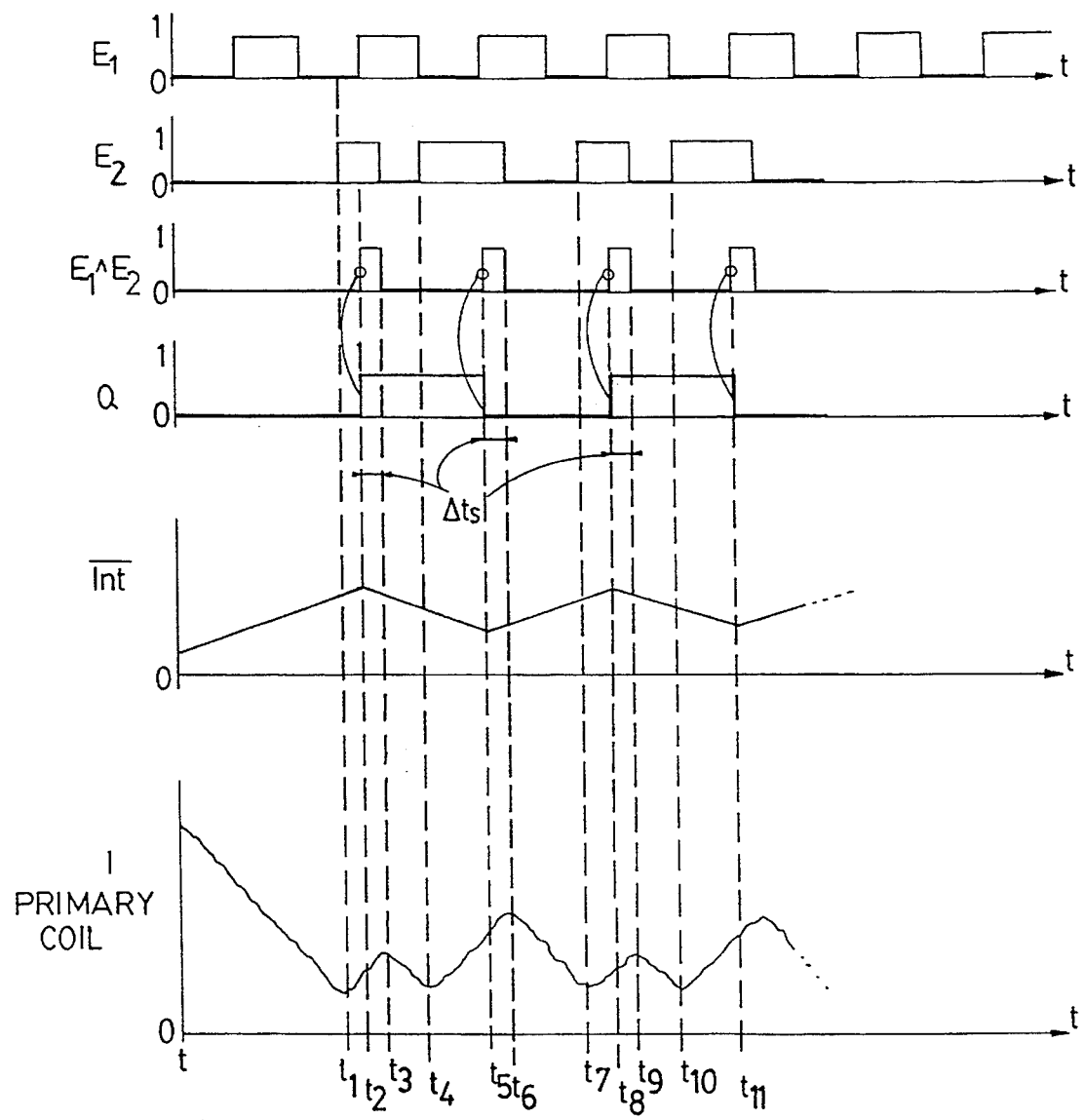
FIG. 3 is a time chart showing signals in the circuit of FIG. 2.

Below, the operation of the illustrated circuit will be described with reference to FIG. 3. In the operation of the high-voltage generator, the current detection circuit 28 continually senses the voltage at the precision resistor 26 which is proportional to the primary coil current. This voltage is rectified in the rectifier 30, differentiated in the differentiator 32 and smoothed by the subsequent PT1 delay element 34. Thereby, a logic "1" appears at the output (E2) of the PT1 delay element 34 when the primary coil current increases, whereas a logic "0" appears when the primary coil current decreases. Hence, the current detection circuit detects changes in the primary coil current and converts the same to logic signals ("1": increasing; "0": decreasing). The output signal E2 from the current detection circuit 28 is combined in the AND gate 36 with the output signal E1 (input clock) from the oscillator 38.

At time $t_0$ the instantaneous working frequency of the oscillator is relatively far from optimum, i.e., the primary coil current I is significantly larger than $I_{min}$. In the interval $t_0 \rightarrow t_1$ the sweep direction (frequency change) is towards the optimum and the primary coil current I decreases ($E_2=0$). At $t_1$ the coil current temporarily reaches the minimum coil current, and in the subsequent interval $t_1 \rightarrow t_3$ the coil current rises again and the comparator output E2 adopts "1". By the AND operation of E1 (input clock) and E2, the polarity of the Q output of the JK flip-flop will change only at the next rising edge of E1, and the sweep direction is only changed at $t_2$, Together with the change of polarity of Q, the integrator 44 also changes its integrating direction, and the change in the sweep direction will result therefrom as will be described below.

The interval $t_2 \rightarrow t_3$ particularly comprises the delay by the PT1 element and the further delays through the overall system. The total delay time is designated $\Delta t_s$. Hence, the primary coil current I only decreases again at $t_3$ and again attains the minimum coil current at $t_4$, and the process described above will be repeated.

In order to more clearly illustrate the time sequence during operation of the circuit of the present invention, the primary coil current is greatly expanded along the time axis. In practice, the system delay time is much smaller than the period of the clock generator 38, i.e. $\Delta t_s \ll T$.

As the clock oscillator E1 and the comparator signal E2 are not synchronous, the reaction time between the discrimination of the rise in coil current for changing the sweep direction is not constant and may at most be half a period T/2 of the clock generator 38 ($t_1 \rightarrow t_2$ or $t_4 \rightarrow t_5$).

Due to the combination of the output signal E2 from the comparator or the current detection circuit and a clock signal, one obtains a time interval in which the sweep direction cannot be changed. It is thereby possible to detect the increase and decrease in primary coil current in a better and more reliable way. Also, uncontrolled conditions will not result thereby.

The output voltage INT of the integrator 44 is used to drive the voltage-controlled oscillator 22. In the illustrated embodiment the oscillator is a VCO which provides a square-wave supply voltage with a pulse duration which is modulated in response to the amplitude of the integrator output voltage, this supply voltage being intended for the transformer 10 of the high-voltage generator. In practical use, the ramp-like rising and falling integrator output voltage INT causes a modulation of the oscillator output frequency of about at a working frequency of about 19–30 kHz. The lag control element 24 on the output side of the oscillator 22 delays the output signal from the oscillator 22 so that proper driving of the output-stage transistors of the push-pull output stage 16 is ensured.

If, on account of a disturbance or a failure in the resonant circuit, the output voltage of the integrator is below a first reference value Ref. 1, or in excess of a second reference value Ref. 2, the comparators 46 or 48 will detect such a condition and the JK flip-flop will be set or reset to a defined initial state, respectively. The signals SET and RESET therefore have higher priority and force the sweep direction to the proper direction. Thereby the output voltage from the voltage-controlled oscillator will remain within a certain predetermined frequency range, for instance between 19 kHz and 30 kHz. This is necessary because otherwise, at resonance frequencies of the subsequent high-voltage generator (which could simply be described as a PT2 element) which are outside of this range, the oscillator circuit might rise uncontrolledly.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method of generating a high voltage at low frequency in an electrostatic powder coating gun comprising a high-voltage generator which includes a transformer and a high-voltage cascade arrangement on an output side of the transformer, in which an output voltage from said transformer is supplied to a low-voltage input of said high-voltage cascade arrangement and an output voltage from said high-voltage cascade arrangement is supplied to a high-voltage coating electrode and a primary coil of said transformer is fed by an a.c. supply voltage operating at a working frequency, comprising the steps wherein during operation of said coating gun, a frequency of said a.c. supply voltage is continuously varied around said working frequency;

a variation of a current intensity of a primary coil current of said transformer is also continuously detected, and a direction of frequency variation is reversed whenever an increase in said current intensity of said primary coil current is detected.

2. The method claimed in claim 1, wherein said frequency of said a.c. supply voltage is varied within a predetermined limited range.

3. The method claimed in claim 2, wherein said frequency of said a.c. supply voltage is selected to be within the range of from 15 to 30 kHz.

4. The method claimed in claim 3, wherein said frequency of said a.c. supply voltage is selected to be within the range of from 19 to 27 kHz.

5. The method claimed in claim 1, wherein said supply voltage is a square-wave voltage.

6. A method claimed in claim 1, wherein said frequency of said a.c. supply voltage is varied by about ±50 to ±150 Hz during operation of said coating gun.

7. The method claimed in claim 1, wherein said frequency of said a.c. supply voltage is varied at a frequency of from 60 to 150 Hz.

8. An electrostatic powder coating gun comprising:

a high-voltage generator which includes a transformer, and a high-voltage cascade arrangement on an output side of said transformer, in which an output voltage from said transformer is supplied to a low-voltage input of said high-voltage cascade arrangement, an output voltage from said high-voltage cascade arrangement is supplied to a high-voltage coating electrode, and a primary coil of said transformer is fed by an a.c. supply voltage operating at a working frequency;

a current detection circuit for continually detecting a variation in current intensity of a primary coil current of said transformer;

a sweep generator for continually varying a frequency of said a.c. supply voltage about said working frequency during operation of said coating gun; and control means for controlling operation of said sweep generator.

9. The electrostatic powder coating gun claimed in claim 8, wherein said control means is operable to change a direction of frequency variation whenever an increase in said current intensity of said primary coil current is detected.

10. The electrostatic powder coating gun claimed in claim 8, wherein said current detection circuit comprises a precision resistor having a connection with said primary coil of said transformer, a peak rectifier connected at said connection, and a differentiator and a delay element connected in series with said peak rectifier and said control means.

11. The electrostatic powder coating gun claimed in claim 8, wherein said control means comprises an AND gate, a JK latching circuit and an integrator, one input of said AND gate being connected to an output of said current detection circuit, another input being connected to a clock, an output of said AND gate being connected to a clock input of said latching circuit, an output from said JK latching circuit being provided to said integrator and an output from said integrator constituting an input signal to said sweep generator.

12. The electrostatic powder coating gun claimed in claim 11, wherein said output from said integrator is fed back via two comparators to one of a set input and reset input of said JK latching circuit, a logic "1" continuously appearing at a J-input and a K-input of said latching circuit.

13. The electrostatic powder coating gun claimed in claim 8, wherein said sweep generator comprises a voltage-controlled oscillator and a lag control element and an output of said sweep generator is connected to the output driver stage comprising a push-pull amplifier and an electrolytic capacitor and an output to said primary coil of said transformer.

* * * * *